Sept. 3, 1963
R. B. HOFFMAN
3,102,988
SPLIT CORE TRANSFORMER WITH REMOTELY ACTUATED MOUNTING STRUCTURE
Filed Sept. 12, 1961
2 Sheets-Sheet 1
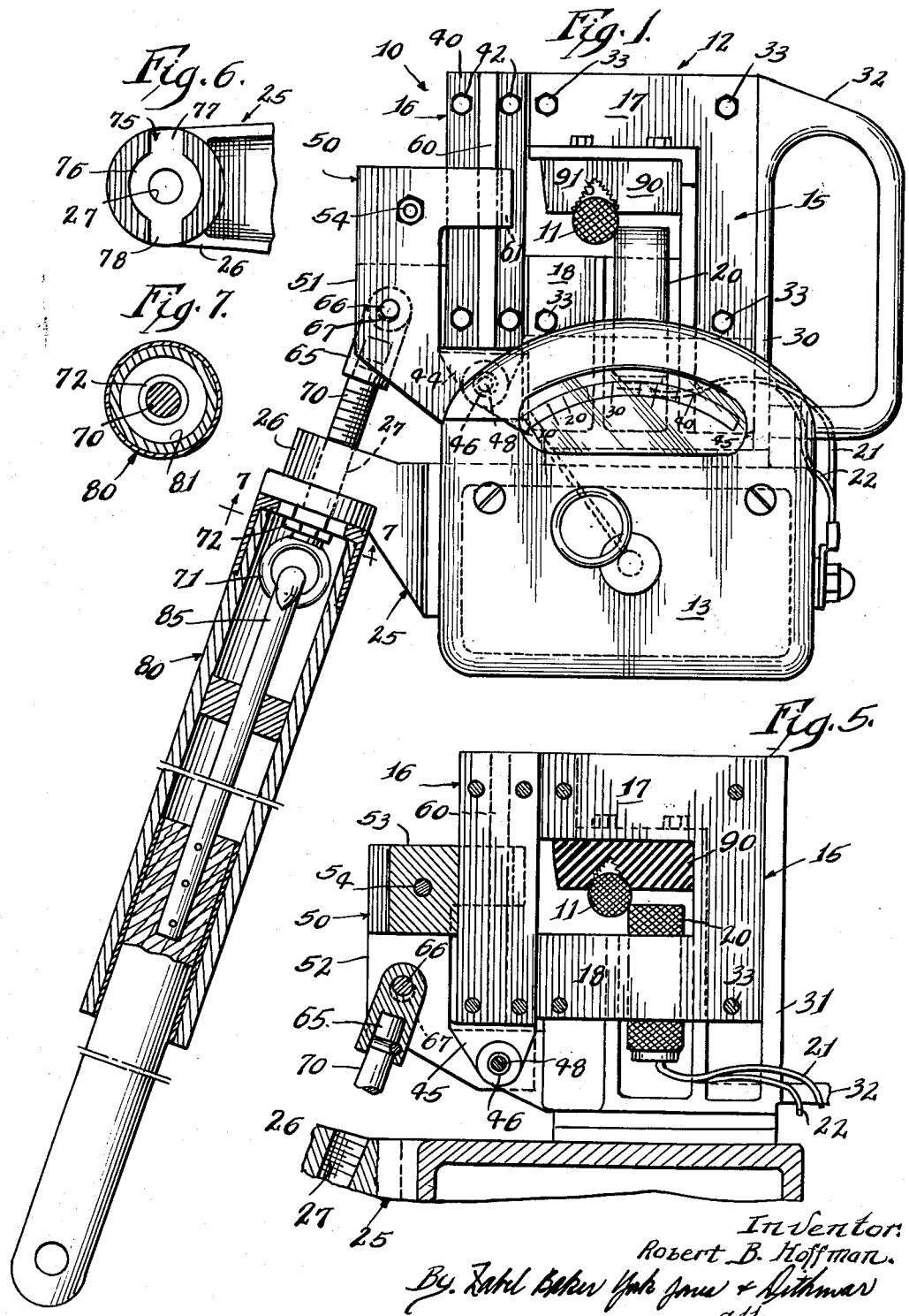
Inventor:
Robert B. Hoffman
By Zahl Baker York Jones & Githman
Attorneys.

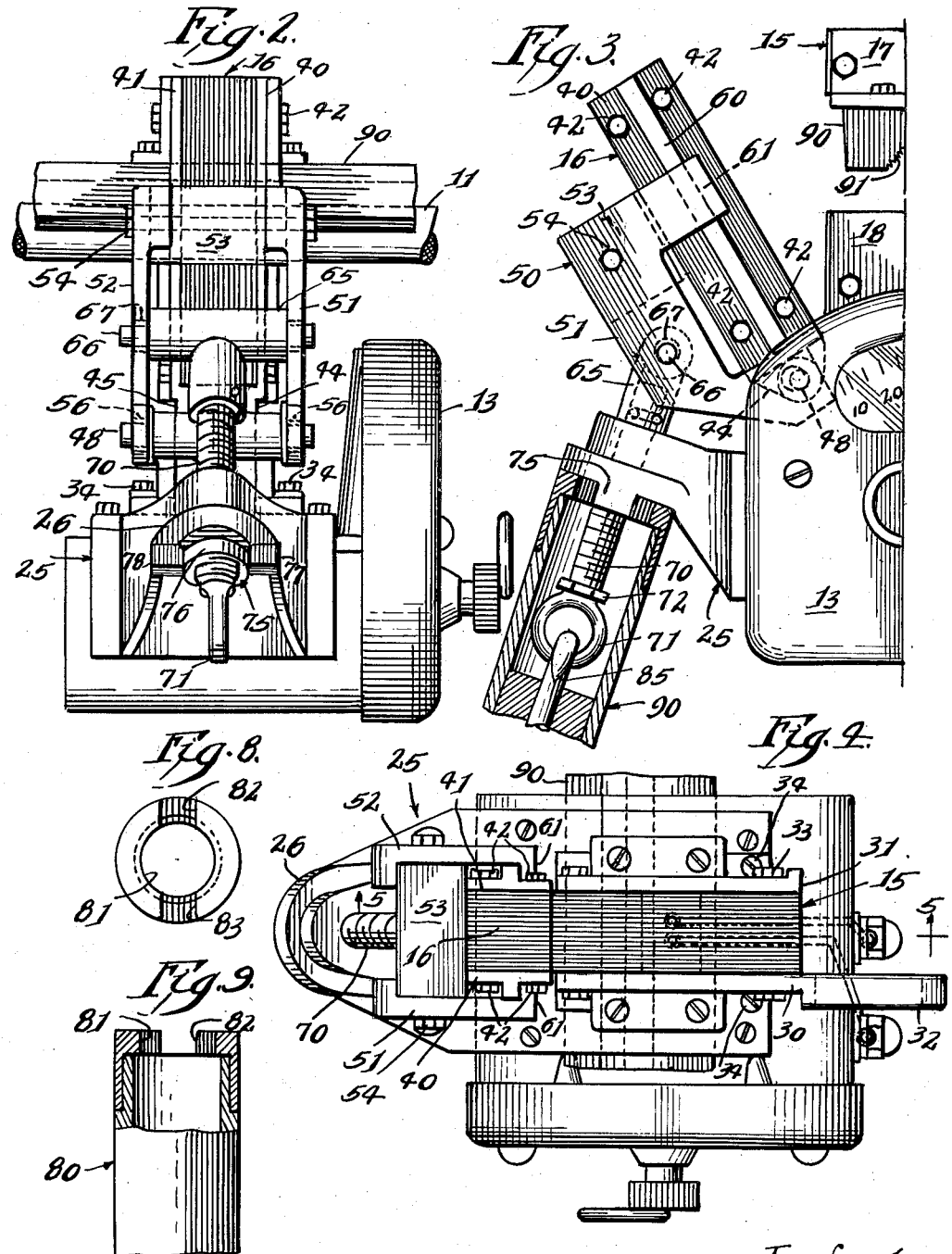

United States Patent Office 3,102,988
Patented Sept. 3, 1963

3,102,988
SPLIT CORE TRANSFORMER WITH REMOTELY ACTUATED MOUNTING STRUCTURE
Robert B. Hoffman, Barrington, Ill., assignor to HD Electric Company, Deerfield, Ill., a corporation of Illinois
Filed Sept. 12, 1961, Ser. No. 137,690
5 Claims. (Cl. 336—176)

This invention relates to a split core transformer with remotely actuated mounting structure. As here shown and described, the transformer is mechanically and electrically associated with a meter to provide an electrical measuring instrument adapted to indicate the maximum current flowing through a conductor.

The present measuring instrument is of the same general type as those shown in Mitchell U.S. Patents 2,165,290 and 2,273,534, both owned by the assignee of this application.

Measuring instruments of the type here involved and shown in the aforesaid patents are adapted to function with power conductors, usually overhead power conductors. Accordingly, it is necessary to mount the instrument on such a conductor, and subsequently to remove the instrument from the conductor.

Prior instruments such as shown in the aforesaid patents are put in place on and removed from an overhead conductor by means of two applicator poles of the type commonly called hot sticks. Usually two linemen are required for these functions, one handling each hot stick, and both linemen must climb to and from positions in proximity to the conductor.

One object of this invention is to avoid the aforesaid shortcoming of prior instruments of this type, and to provide an instrument which can be mounted and demounted with respect to an overhead conductor by means of a single hot stick manipulated by a single lineman.

Other objects, advantages and details of the invention will be apparent as the description proceeds, reference being had to the accompanying drawings wherein an instrument embodying a preferred form of the invention is shown. It is to be understood that the description and drawings are illustrative only, and that the scope of the invention is to be measured by the appended claims.

In the drawings:

FIG. 1 is a front elevational view of an electrical measuring instrument embodying the invention, the instrument being shown in association with a hot stick illustrated in longitudinal section.

FIG. 2 is a side elevational view of the instrument shown in FIG. 1, the hot stick being omitted.

FIG. 3 is a fragmentary front elevational view showing the moving parts in an alternative or open position.

FIG. 4 is a top plan view of the instrument shown in FIG. 1.

FIG. 5 is a fragmentary sectional view on line 5—5 of FIG. 4.

FIG. 6 is a bottom view of that portion of the instrument which is adapted to engage the hot stick used to mount and demount the instrument with respect to an overhead conductor.

FIG. 7 is a sectional view on line 7—7 of FIG. 1.

FIG. 8 is an end view of a hot stick, and

FIG. 9 is an elevational view, partly in section, of the hot stick end which engages the instrument.

Referring now to the drawings, the invention is shown embodied in an electrical measuring instrument 10 adapted to function in connection with an overhead power conductor 11 on which the instrument is shown mounted. Broadly speaking, instrument 10 comprises a split core transformer 12 and a meter 13. By way of example, meter 13 may be a thermal demand ammeter.

Transformer 12 is of the split core type so as to permit mounting and demounting of the instrument with respect to conductor 11. The transformer includes a C-shaped core assembly 15 (best shown in FIG. 5) and the bar-shaped core assembly 16 adapted to close the open side of C-shaped core assembly 15. Bar-shaped core assembly 16 is mounted for pivotal movement, as will be seen.

C-shaped core assembly 15 includes core legs 17 and 18. A secondary winding 20 is shown applied to core leg 18 and connected by leads 21 and 22 to meter 13. Conductor 11 on which the instrument is mounted serves as the transformer primary.

Coming now to a description of the remotely actuated mounting structure which forms the specific subject matter of this invention, instrument 10 includes a base member or support 25 to which is mounted both transformer 12 and meter 13. Referring to FIG. 1, support 25 has a left hand lateral extension 26 which is provided with a threaded aperture 27 (FIG. 5). As shown, extension 26 is inclined to the horizontal, and aperture 27 is disposed at right angles to the plane of the extension.

C-shaped core assembly 15 includes front and rear covers or plates 30 and 31 which project downwardly from the core element proper and are mounted on support 25. Carrying handle 32, as shown, is a lateral extension of front plate 30. Bolts 33 secure plates 30 and 31 to the C-shaped core element proper, and, in turn, hold together the laminations making up the core element. Bolts 34 secure plates 30 and 31 to support 25, as best shown in FIGS. 2 and 4.

Bar-shaped core assembly 16 also includes front and rear covers or plates 40 and 41, the plates and core element laminations being secured together by bolts 42.

Plates 40 and 41 of bar-shaped core assembly 16 project below the core element proper as extensions 44 and 45, best shown in FIG. 2. Extensions 44 and 45 are provided with aligned enlarged apertures 46 (FIGS. 1 and 5) through which extends pivot means 48. The end portions of pivot means 48 are secured in aligned openings provided in plates 30 and 31 of C-shaped core assembly 15. As mentioned, apertures 46 in extensions 44 and 45 of plates 40 and 41 are larger than pivot means 48, the reason being to provide some lost motion between pivot means 48 and bar-shaped core assembly 16 to avoid binding and insure intimate closing contact between the latter and C-shaped core assembly 15.

The structure so far described enables bar-shaped core assembly 16 to pivot between the closed position shown in FIG. 1 and an open position such as shown in FIG. 3. The pivoting action is under the control of an actuator and associated elements which now will be described.

An actuator 50 is mounted for pivotal movement with respect to support 25. As here shown, actuator 50 pivots on pivot means 48, the same means that serves to pivot bar-shaped core assembly 16. Actuator 50 includes front and rear plates 51 and 52, and back-up means 53 extending between them. In the form of the invention shown, plates 51 and 52 are secured to back-up means 53 by bolt 54.

Apertures 56 (FIG. 2) in actuator plates 51 and 52 embrace pivot means 48 and are enlarged to provide a certain amount of lost motion.

Plates 40 and 41 of bar-shaped core assembly 16 have longitudinal external shoulders or ribs 60 which are embraced by inturned flanges 61 (FIG. 4) on plates 51 and 52 of actuator 50. The location of these inturned flanges 61 is such that play is provided for bar-shaped core assembly 16 between flanges 61 and back-up means 53. The purpose for this play is the same as the purpose for the aforesaid enlarged apertures, namely to avoid binding and provide intimate closing contact between the respective core assemblies.

A generally T-shaped member 65 is pivotally mounted on actuator 50. As shown, member 65 is traversed by a pin 66 which extends through enlarged apertures 67 in plates 51 and 52 of actuator 50. Member 65 is located in general alignment with threaded aperture 27 in extension 26 of support 25.

An eye bolt 70 is threaded through aperture 27 with its free end rotatably secured to member 65 of actuator 50. It will be understood that rotation of eye bolt 70 causes actuator 50 and associated bar-shaped core assembly 16 to pivot between the closed position shown in FIG. 1 and an open position such as illustrated in FIG. 3. As mentioned, the lost motion relationship between the several parts avoids binding and insures intimate contact between the core assemblies when in the closed position shown in FIG. 1.

The lower face of extension 26 of support 25 is provided with boss means 75 (FIG. 6) adjacent threaded aperture 27. The purpose of boss means 75 is to establish a non-rotatable engagement with the complementary shaped remote end of a hot stick 80.

FIGS. 8 and 9 illustrate a hot stick end shaped to accommodate the boss means 75 shown in FIG. 6. The illustrated boss means 75 includes a central annulus 76 and diametrically opposed radial bosses 77 and 78. The annulus 76 is received within central opening 81 of the hot stick end, while bosses 77 and 78 are received in hot stick recesses 82 and 83 (FIG. 8).

Central opening 81 of the hot stick end is of sufficient diameter to accommodate passage of eye 71 of eye bolt 70 so eye 71 may telescope within the hot stick end as shown in FIGS. 1 and 3. Eye 71 is engaged by rotatable hook 85 of the hot stick.

A hot stick 80 is associated with instrument 10 in obvious manner and is effective to elevate the instrument into position on an overhead conductor 11. Rotation of the manual end of hot stick 80 serves to rotate eye bolt 70 and close bar-shaped core assembly 16 into intimate contact with C-shaped core assembly 15.

A stop member 72 desirably is located on the shank of eye bolt 70 adjacent eye 71 to terminate rotation of the eye bolt upon engagement with boss means 75. The stop member is positioned to prevent the development of damaging stresses during closure of bar-shaped core assembly 16.

The numeral 90 designates an elongated member of insulating material which has a longitudinal V-shaped groove 91 adapted to receive conductor 11 and provide lateral stability when the instrument is in mounted position.

From the above description it is thought that the construction and advantages of this invention will be readily apparent to those skilled in the art. Various changes in detail may be made without departing from the spirit or losing the advantages of the invention.

Having thus described the invention, what I claim as new and desire to secure by Letters Patent is:

1. A split core transformer with remotely actuated mounting structure comprising:
a support having a threaded aperture therein;
boss means on the lower face of said support adjacent said threaded aperture adapted to engage the remote end of a hot stick in non-rotatable manner;
a C-shaped core assembly mounted on said support;
a bar-shaped core assembly adapted to close the open side of said C-shaped core assembly;
pivot means on said C-shaped core assembly, said bar-shaped core assembly mounted to pivot loosely on said pivot means;
an actuator for said bar-shaped core assembly mounted to pivot loosely on said pivot means, said actuator loosely engaging said bar-shaped core assembly;
a member pivotally mounted on said actuator in general alignment with the threaded aperture in said support; and
an eye bolt rotatably secured to said member and threaded through said aperture whereby a single hot stick engaging said boss means and said eye bolt is effective to support said transformer in remote position and pivot said bar-shaped core assembly into and out of intimate contact with said C-shaped core assembly in mounting and demounting said transformer with respect to an overhead conductor.

2. A split core transformer with remotely actuated mounting structure comprising:
a support having a threaded aperture therein;
boss means on the lower face of said support adjacent said threaded aperture adapted to engage the remote end of a hot stick in non-rotatable manner;
a C-shaped core assembly mounted on said support;
a bar-shaped core assembly adapted to close the open side of said C-shaped core assembly;
pivot means pivoting said bar-shaped core assembly with respect to said C-shaped core assembly;
an actuator for said bar-shaped core assembly pivoted on said pivot means, said actuator loosely engaging said bar-shaped core assembly;
a member pivotally mounted on said actuator in general alignment with the threaded aperture in said support, and
an eye bolt rotatably secured to said member and threaded through said aperture whereby a single hot stick engaging said boss means and said eye bolt is effective to support said transformer in remote position and pivot said bar-shaped core assembly into and out of intimate contact with said C-shaped core assembly in mounting and demounting said transformer with respect to an overhead conductor.

3. The combination of claim 2 wherein said bar-shaped core assembly has external shoulders, and wherein said actuator includes back-up means adapted to engage said bar-shaped core assembly and flanges adapted to engage said shoulders, the spacing between said back-up means and said flanges providing play between said bar-shaped core assembly and said actuator to avoid binding and insure intimate closing contact between said core assemblies.

4. The combination of claim 2 wherein said boss means comprises a central annulus surrounding said threaded aperture and at least one boss in radial relation with said annulus.

5. The combination of claim 2 with the addition of stop means on said eye bolt adapted to engage said boss means to prevent the development of damaging stresses during closure of said bar-shaped core assembly.

References Cited in the file of this patent

UNITED STATES PATENTS

| 1,223,791 | Jackson | Apr. 24, 1917 |
| 1,853,598 | Berkemmaier | Apr. 12, 1932 |
| 2,165,290 | Mitchell | July 11, 1939 |
| 2,323,996 | Hubbard | July 13, 1943 |

FOREIGN PATENTS

| 327,837 | Great Britain | Apr. 17, 1930 |